Aug. 27, 1946.  W. JOHNSTON, JR  2,406,380
CINDER POT
Filed Nov. 19, 1942  3 Sheets-Sheet 1
FIG. I.
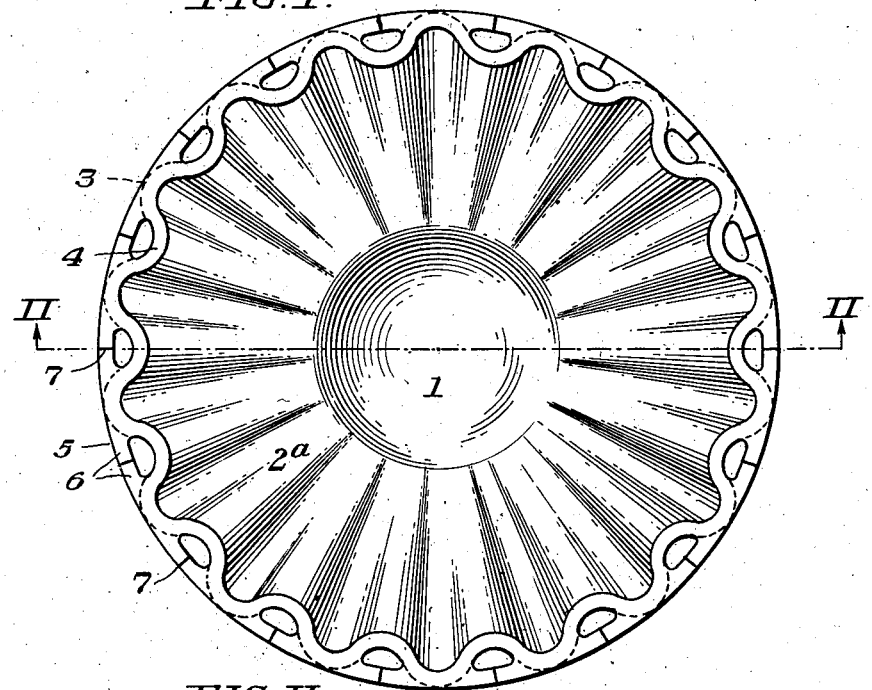
FIG. II.
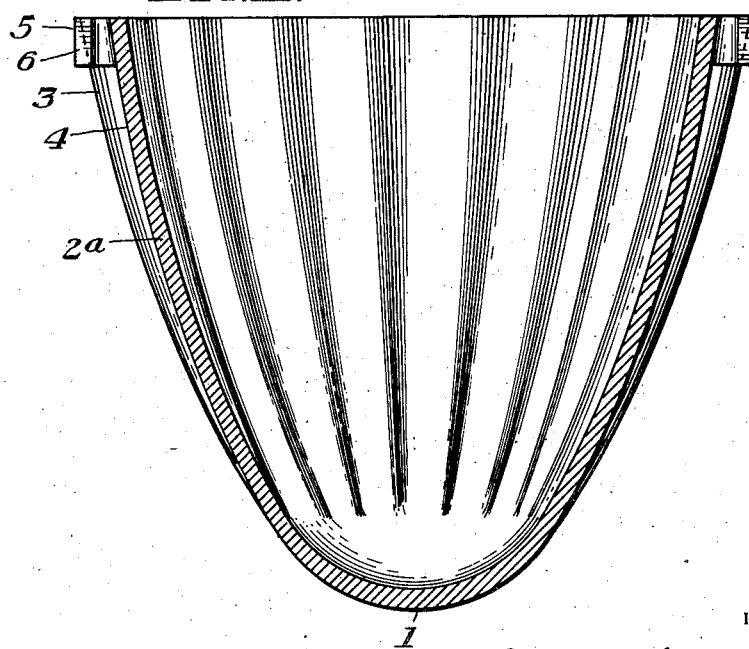
INVENTOR
William Johnston Jr.
by William B. Wharton
his attorney Aug. 27, 1946.  W. JOHNSTON, JR  2,406,380
CINDER POT
Filed Nov. 19, 1942  3 Sheets-Sheet 2
FIG. III.
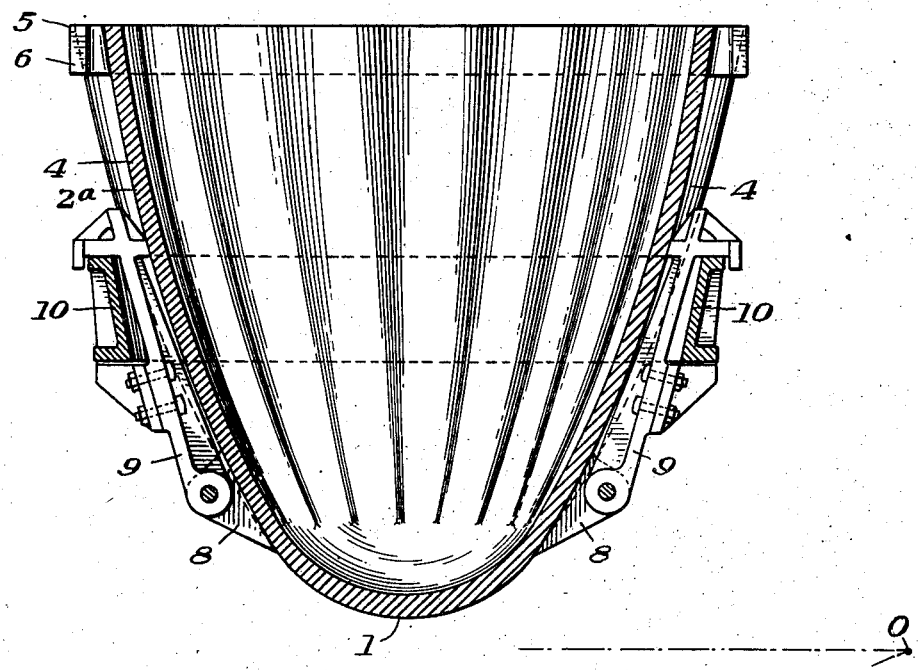
FIG. IV.
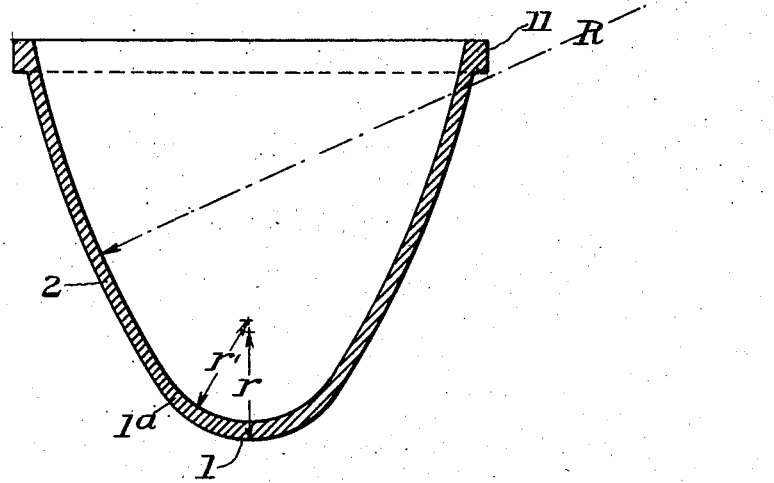
INVENTOR
William Johnston Jr.
by William B. Wharton
his attorney Aug. 27, 1946.   W. JOHNSTON, JR   2,406,380
CINDER POT
Filed Nov. 19, 1942   3 Sheets-Sheet 3
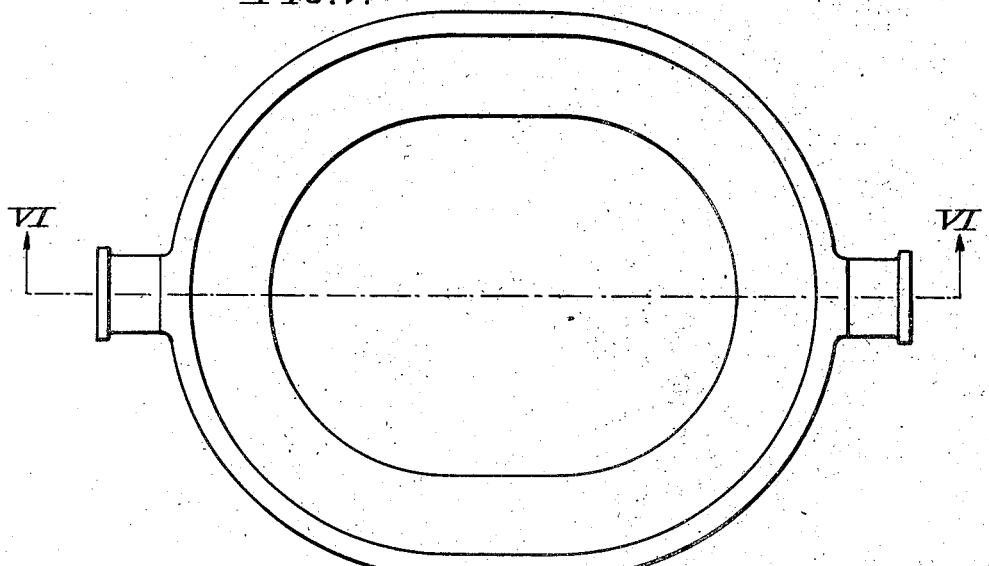
FIG. V.
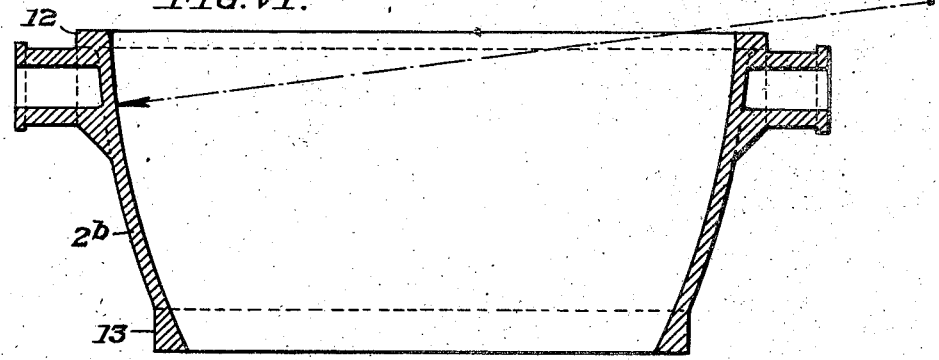
FIG. VI.
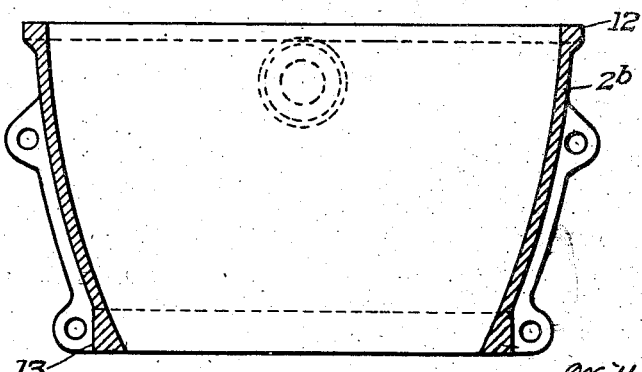
FIG. VII.
INVENTOR
William Johnston Jr.
By William B. Wharton
his attorney Patented Aug. 27, 1946

2,406,380

UNITED STATES PATENT OFFICE 2,406,380

CINDER POT

William Johnston, Jr., Wilkinsburg, Pa.

Application November 19, 1942, Serial No. 466,095

3 Claims. (Cl. 266—39)

This invention relates to cinder pot construction.

By the term "cinder pot," as herein used, I mean a large vessel of iron or steel which is used to receive and convey slag and cinder from furnaces used in processes that involve production of slag or cinder, such as metal-producing furnaces of the blast, open hearth or smelting types.

As the slag or cinder which the cinder pots receive is molten when delivered to them, and because they commonly are required to retain such material until it has been conveyed by them to a slag-disposal yard, the cinder pots become highly heated. It is quite usual for cinder pots which service open hearth furnaces to retain the slag until the crust, or "skull" formed by solidification of the slag includes a substantial proportion of the slag in the cinder pot.

In service, the high temperature acquired by the cinder pots and the relatively great weight of the cinder pots themselves and their contents, leads to various effects which tend to destroy the shape or structure of the cinder pots.

The original, or primitive, cinder pot of conical type has a circular side wall progressively increasing in diameter from a closed bottom to the open upper end of the cinder pot, so that in vertical section the main portion of the cinder pot wall is represented primarily by two straight upwardly-divergent lines. In cinder pots of the larger size, such as cinder pots of 400 cubic foot capacity the wall is from 2 inches to 3 inches in thickness, and in conical cinder pots of the primitive sort the wall does not deviate from a true circle in cross section at any point above the rounded bottom of the cinder pot.

As a cinder pot stands with a load of molten slag, heat is dissipated most rapidly in the lower region of the cinder pot in which the area of the heat radiating surface is in high ratio with respect to the volume of hot slag which it encloses, and in the upper region of the cinder pot in which heat is dissipated directly to the air as well as through the wall of the cinder pot. A relatively heavy skull thus forms more rapidly in the lower and upper regions of the cinder pot than in its intermediate region, in which region a substantial body of slag tends persistently to remain at high temperature. This results from the formation of the thick crust, or skull at the bottom of the cinder pot and more particularly at the open upper end of the cinder pot, so that heat is dissipated through the cinder pot wall in a region in which the cross-sectional area of the cinder pot and its contents is great. As a crust tends to form against the inner surface of the cinder pot wall in this region, heat transfer through the wall is further inhibited. When cinder pots, and particularly conical type cinder pots, stand for an extended period of time to permit their content of slag to solidify, there is a "critical heat zone" about two-thirds of the way up from the extreme bottom of the cinder pot, in which the temperature of the cinder pot wall is high and may for a long period be as high as about 1700° F. to 1800° F. at the inside of the cinder pot wall.

Such high temperature, so localized, leads to differences in expansion and contraction between the portion of the cinder pot wall in the "critical heat zone" and the adjacent substance of the cinder pot wall. In simple, unspecialized cinder pots, inability of the truly circular wall freely to expand and contract leads to firecracking and checking. When the cinder pot is supported at or above the "critical heat zone," as by engagement with lifting lugs or trunnions which project outwardly from the cinder pot wall, the weight of the cinder pot and its contents underlying the zone of engagement places the cinder pot wall under tension from the region of its engagement. Placing the most highly heated region of the cinder pot under tension causes the cinder pot to "sag" from that region. That is, the cinder pot becomes unduly and irregularly elongated, thus destroying the proper contour of its lower region. Another destructive effect encountered in service is deformation of the cinder pot by pinching or squeezing in its most highly heated region when the cinder pot is lifted. That effect, which causes cross-sectional distortion in the upper region of the cinder pot, is in measure caused even when specialized means are provided for supporting the cinder pot from its lower and less highly heated region. It is caused in much greater order if the cylinder pot is lifted by engagement with trunnions, or lifting lugs, in accordance with unspecialized practice.

The tendency of the cinder pot wall to check and firecrack in its most highly heated region is in great measure prevented by corrugating the cinder pot wall vertically, so that an accordion effect is produced by tendency of the wall to expand or contract. This expedient is described in detail in my prior Patents No. 2,057,528 and No. 2,181,331. Means by which the weight of the cinder pot is carried from the lower region of the cinder pot wall, to place the most highly heated region of the cinder pot wall under compression rather than tension when the cinder pot is lifted, is described in my prior Patent No. 2,198,252.

Means for limiting the extent of the cross-sectional distortion caused by mechanical pinching or squeezing is described in my prior Patent No. 2,301,880.

In the use of cinder pots there is a further destructive effect of high temperature, which is independent of any of those above noted, which causes cross-sectional distortion of the cinder pot, and which may ultimately lead of itself to firecracking or checking. This is the tendency of the cinder pot wall in its most highly heated region to "creep" inwardly, caused by differences in expansion and contraction of the inner and outer portions of the pot wall, which differences occur by reason of the greater temperature range to which the inner portion is subjected by its proximity to the slag charges. This inward "creeping," unlike the cross-sectional distortion caused by mechanical pinching or squeezing, does not cause great irregularity in the cross-sectional shape of the pot in the zone of its occurrence. It does, however, produce a fairly regular inward bend, or reverse bulge, extended as a band around the cinder pot wall. This causes great difficulty in removal of slag from the cinder pot after a skull has formed, requiring that the slag be broken up in the cinder pot itself; ultimately reduces the capacity of the cinder pot substantially; and greatly decreases the useful life of the cinder pot.

It has been attempted to retard this "creeping" by making the side wall of the cinder pot of varied thickness in different regions vertically of the cinder pot. Thus it has been proposed to increase the wall thickness in the critical heat zone. One way of so doing is to form the outer surface of the cinder pot on a line which curves vertically of the cinder pot, but retaining a straight-line contour of the interior surface. One surface of the cinder pot wall rather than the cinder pot wall itself being outwardly curved, the effect is regionally to increase the wall thickness. Regional thickening of the cinder pot wall by itself has been found ineffective substantially to retard bodily inward creeping of the wall, and an unduly increased wall thickness tends to promote firecracking and checking of the wall because it acts to retard heat radiation from the cinder pot.

I have succeeded in retarding the destructive effect of "creeping," by utilizing a novel wall contour for cinder pots which resists the distorting effects that arise from the unequal expansion and contraction of the inner and outer portions of the wall under the different temperature ranges to which they are subjected. This novel wall contour is applicable to cinder pots which otherwise are of conventional unspecialized conical type; but it is applicable also to conical type cinder pots having corrugated side walls, to cinder pots so organized that the weight of the cinder pot and its contents is carried from the lower region of the cinder pot, with cinder pots organized to prevent cross-sectional distortion by mechanical pinching or squeezing, and with cinder pots organized with any combination of those specialized features.

The beneficial effect of my novel wall contour is not restricted to conical type cinder pots having spherical bottoms. It is had nonetheless if the bottom of the cinder pot be concave rather than convex, if it be but slightly convex, or approximately flat. It is true that the effect of "creeping" is most marked in conical cinder pots having closed bottoms and the side wall of which is circular in cross-section throughout its height, and correspondingly the benefit derived from my novel wall contour is greatest in cinder pots of that general type. I have found, however, that cinder pots are susceptible of "creeping" even though they are of ovate or otherwise non-circular cross-section, or if the bottoms of the cinder pots be partially or wholly open, or if they include both those departures from the structural organization of conical type cinder pots, as in the cinder pot disclosed in my prior Patent No. 2,242,075; and have found my novel wall contour effective to resist and retard creeping also in cinder pots primarily so formed.

In the accompanying drawings:

Fig. I is a plan view of a cinder pot embodying the novel structure of my present invention, which has its side wall corrugated in accordance with my Patent No. 2,057,528, and which is stiffened against mechanical distortion by a split ring, or plurality of compression elements at its open upper edge in accordance with my Patent No. 2,301,880.

Fig. II is a vertical sectional view through the cinder pot of Fig. I taken in the plane of the section line II—II of Fig. I.

Fig. III is a vertical sectional view, analogous to Fig. II, showing a cinder pot comprising all the features of the cinder pot shown in Figs. I and II, and additionally equipped with lifting arms engaged with the outer surface of the cinder pot adjacent its bottom and engaging a lifting ring, so that the weight of the cinder pot and its contents is taken in a lower region of the cinder pot and is transmitted to the lifting ring.

Fig. IV is a simplified vertical sectional view through a cinder pot otherwise of unspecialized conical type, showing without complicating structure the contour of the cinder pot wall in which my present invention resides and which is included with features of prior invention in the showing of Figs. I, II and III; this figure of the drawings showing the radii on which the bottom and the side wall respectively of cinder pots are developed in obtaining the advantages of my invention.

Fig. V is a plan view of a cinder pot of open-bottom type having its side wall outwardly curved in accordance with my invention.

Fig. VI is a vertical longitudinally central view taken through the open-bottom cinder pot in the plane of the section line VI—VI of Fig. V.

Fig. VII is a vertical cross-sectional view through the cinder pot taken in a plane perpendicular to the plane of Fig. VI.

Referring initially to Fig. IV of the drawings, it is to be understood that the cinder pot therein shown is fundamentally not only of the least specialized conical type, but that there also are omitted from the showing such conventional accessories as feet and lifting lugs.

In Fig. IV, the extreme bottom 1 of the cinder pot is shown as developed on a short radius $r$ lying along the vertical axis of the cinder pot. An intermediate wall region $1a$ of the cinder pot, developed on the radius $r'$ blends the extreme bottom 1 of the cinder pot with its side wall 2. Previously in cinder pots, both of uncorrugated and otherwise unspecialized sort and of the sort in which the side wall is corrugated vertically of the cinder pot, the side wall forms a straight taper, no substantial curvature being followed from the bottom of the cinder pot to the edge of the wall at the upper open end of the cinder pot. In accordance with my present invention, however, the side wall 2 of the cinder pot, from the region of blending with the bottom curves outwardly away from the vertical axis of the cinder pot. This outward curvature resists the tendency of highly heated metallic containers to creep inwardly in service, and accords with a principle which has been used with advantage in heating stoves but which is novel in application to cinder pots.

It is, as has been noted above, common practice to retain the slag in the cinder pots until it has formed at least a substantial crust, or skull, around a center which still may be molten. Because there is at least partial solidification of the slag, it is necessary in order to discharge it from the cinder pot without previously breaking it up that the maximum diameter of the cinder pot be at its extreme upper end. To reconcile with this requirement the advantageous outward curvature of the cinder pot side wall, I develop the side wall of the cinder pot on a radius R which is relatively long with respect to the height of the cinder pot, and which centers at a point O at least as high as the upper end of the cinder pot. As shown, the length of radius R is approximately twice the height of the cinder pot; but it may bear either a lesser or greater relation to the cinder pot height in accordance with the ratio between the diameter of the cinder pot at its bottom and the diameter of the cinder pot at its open upper end. As shown in Fig. IV, the radius on which the interior surface of the cinder pot wall is formed centers substantially above the upper end of the cinder pot. It will be seen in the drawings, and is particularly clear in Fig. IV, that the cinder pot wall has a curved interior surface representing such small portion of the circumference of a circle of large radius, in vertical section through the cinder pot, that the cross-sectional area of the cinder pot wall increases progressively from the bottom to the upper end of the cinder pot. Otherwise expressed, each vertical half of the cinder pot side wall 2, as it appears in Fig. IV of the drawings, approximates in its curvature half or less than half of a catenary.

Following such rule in forming the side wall of the cinder pot, no difficulty is experienced in discharging a solidified body of slag from the cinder pot; and the resistance to inward creep presented by the outward curvature of the cinder pot wall substantially retards distortion from that cause. The side wall as a whole is thus curved outwardly, away from the vertical axis of the cinder pot, and the interior surface of the cinder pot wall is so curved that the cinder pot cavity increases progressively in cross-sectional area up to its open upper end. It is not necessary that the cinder pot wall have its inner and outer surfaces so formed that the wall is of uniform thickness throughout the length of its curvature. If so desired, the cinder pot wall may regionally be thickened by providing a relatively greater curvature (shorter radius) for its outer surface up to a point at which heat radiation is retarded seriously, or if desired may be made regionally thinner by forming the outer surface on a lesser curvature (greater radius) up to a point at which wall strength is unduly decreased.

The unspecialized cinder pot of Fig. IV is shown as provided with a rim 11 at its upper end, as it is preferable although not necessary that the outwardly curved side wall should spring from a stiffening body of metal at both its upper and its lower end. Because the cinder pot of Fig. IV is not corrugated, no substantial advantage would be gained from utilizing the specialized reinforcing ring or rim of my Patent No. 2,301,880, and ring or rim 11 is accordingly a simple continuous body of metal.

Referring now to Figs. I and II of the drawings, the novel contour of the cinder pot side wall substantially as shown in Fig. IV is made a feature of a cinder pot the side wall 2a of which is corrugated vertically of the cinder pot into alternating outward bows 3 and inward bows 4. The advantage of a side wall curved outwardly of the cinder pot in offering resistance to inward creeping is thus obtained in that cinder pot in conjunction with the increased freedom thermally to expand and contract which is provided by the corrugations.

The cinder pot of Figs. I and II also associates with the resistance to thermal creeping provided by the contour of its side wall 2a resistance to mechanical pinching or squeezing of the most highly heated region of that side wall. That last named resistance results from the inclusion of a divided ring, designated generally by reference numeral 5, as part of the cinder pot wall at the upper open end of the cinder pot. This divided ring desirably is formed as an integral casting with the cinder pot wall, and consists of a plurality of segmental compression members 6 blending with the outward bows 4 of the cinder pot wall and separated from each other in the regions lying outwardly of the inward bows 4 by intervals or lines of division 7 which leave adjacent ends of the compression elements very closely spaced with respect to each other. Because of the division of the ring 5 into segments, the segments move radially outward and inward with the outward bows as the cinder pot wall expands and contracts. Because of their close spacing, they come into contact to inhibit cross-sectional distortion of the cinder pot upon merely negligible distortion produced mechanically in the highly heated and expanded region lying closely below the upper end of the cinder pot.

The cinder pot shown in Fig. III of the drawings primarily is identical with the cinder pot shown in Figs. I and II, but in it the novel wall contour of my present invention is associated with yet another feature functioning to retard destructive distortion of the cinder pot. This cinder pot has lugs, or webs 8, projecting from the cinder pot wall at spaced intervals around the periphery of the wall and slightly above the rounded bottom 1 of the cinder pot. Supporting arms 9 are pivotally engaged with lugs 8, and extend upwardly in several of the inward corrugations 4 of the outwardly curved side wall 2a. In their upper regions these pivoted supporting arms 9 engage with a lifting ring 10 which embraces the cinder pot. This organization, by carrying the cinder pot from a cooler region below that in which the cinder pot is embraced by lifting ring 10, places the more highly heated region of the cinder pot wall under compression, and prevents sagging of the cinder pot wall under the weight of the cinder pot and its contents. This also is structurally compatible with the outward curvature of the cinder pot side wall in accordance with my present invention.

Turning to Figs. V, VI and VII of the drawings, the cinder pot therein shown is in accordance primarily with the open-bottom cinder pot shown in my prior Patent No. 2,242,075, being roughly ovate or ellipsoidal in its cross-sectional conformation and being open at its lower as well as its upper end. Instead of being formed on a straight taper, however, the cinder pot side wall 2b is outwardly curved and has its interior surface formed on a radius R' which is relatively long with respect to the cinder pot height, and which centers in a point O' located at least as high as the upper end of the cinder pot. Preferably, as shown, the cinder pot wall 2b springs from a stiffening ring or rim 12 at the upper end of the cinder pot and from a stiffening ring or rim 13 at the lower end of the cinder pot. In this stiffening effect the lower ring or rim 13 takes the place of the closed bottom shown in other figures of the drawings.

It thus appears that the novel feature of curving the side wall of a cinder pot outwardly in such manner that the cross-sectional area of the cinder pot cavity increases progressively from the bottom of the cinder pot to its open upper end is applicable to otherwise unspecialized cinder pots, and also is applicable to cinder pots comprising any one or more of the specialized features which serve to lessen or prevent the noted undesirable effects which promote deterioration of the cinder pot. It thus is possible to resist and substantially to retard thermal inward creeping of the cinder pot wall without sacrificing other features desirable in cinder pot construction or organization. It is, however, to be understood that the invention herein resides wholly in providing the cinder pot side wall with an outward curvature so arranged vertically of the cinder pot that the cross-sectional area of the cinder pot cavity increases progressively to its open upper end.

It is to be understood that the illustration and description of cinder pots made in accordance with my invention as herein given is exemplary and not restrictive. The incorporation of the novel structure constituting my present invention is not limited to cinder pots constructed as herein shown, and the scope of my invention properly is restricted only by the limitations imposed by the definition of the appended claims.

I claim as my invention:

1. A conical type cinder pot having a closed bottom and an open upper end and having a side wall curved vertically of the cinder pot outwardly away from the vertical axis of the cinder pot; the interior surface of the said side wall being developed on a radius of such length and so centered at a level at least as high as the upper end of the cinder pot that the cross-sectional area of the cinder pot cavity increases progressively upwardly of the said side wall to a maximum at the open upper end of the cinder pot.

2. A cinder pot having an open upper end and having a side wall curved vertically of the cinder pot outwardly away from the vertical axis of the cinder pot; the interior surface of the said side wall being developed on a radius of such length and so centered at a level at least as high as the upper end of the cinder pot that the cross-sectional area of the cinder pot cavity increases progressively upwardly of the said side wall to a maximum at the open upper end of the cinder pot.

3. A cinder pot having an open upper end and having a side wall curved vertically of the cinder pot away from the vertical axis of the cinder pot and which springs from a stiffening body of metal both at the lower and at the upper end of the cinder pot; the interior surface of the said side wall being developed on a radius of such length and so centered at a level at least as high as the upper end of the cinder pot that the cross-sectional area of the cinder pot cavity increases progressively upwardly of the said side wall to a maximum at the open upper end of the cinder pot.

WILLIAM JOHNSTON, Jr.